(12) United States Patent
Campbell

(10) Patent No.: US 9,912,371 B2
(45) Date of Patent: Mar. 6, 2018

(54) SELF-ACTIVATED TRANSFER SWITCH

(71) Applicant: RF Micro Devices, Inc., Greensboro, NC (US)

(72) Inventor: Charles Forrest Campbell, McKinney, TX (US)

(73) Assignee: Qorvo US, Inc., Greensboro, NC (US)

( * ) Notice: Subject to any disclaimer, the term of this patent is extended or adjusted under 35 U.S.C. 154(b) by 149 days.

(21) Appl. No.: 15/082,353

(22) Filed: Mar. 28, 2016

(65) Prior Publication Data

US 2017/0019141 A1    Jan. 19, 2017

Related U.S. Application Data

(60) Provisional application No. 62/193,730, filed on Jul. 17, 2015.

(51) Int. Cl.
*H01Q 3/24* (2006.01)
*H04B 1/48* (2006.01)

(52) U.S. Cl.
CPC ..................... *H04B 1/48* (2013.01)

(58) Field of Classification Search
CPC ......................................... H01B 1/48
USPC ........................................ 343/876
See application file for complete search history.

(56) References Cited

U.S. PATENT DOCUMENTS 8,538,368 B1    9/2013   Campbell

OTHER PUBLICATIONS

Cheung, Siu K. et al., "MMIC-Based Quadrature Hybrid Quasi-Circulators for Simultaneous Transmit and Receive," IEEE Transactions on Microwave Theory and Techniques, vol. 58, No. 3, Mar. 2010, pp. 489-497.
Hangai, Masatake et al., "A High Power and Low Loss GaN HEMT MMIC T/R Switch Utilizing Band-pass/Low-pass Configuration," Proceedings of the 44th European Microwave Conference (EuMC), Oct. 2014, IEEE, pp. 1122-1125.
Hara, Shinji et al., "Novel Unilateral Circuits for MMIC Circulators," IEEE Transactions on Microwave Theory and Techniques, vol. 38, No. 10, Oct. 1990, pp. 1399-1406.
Uchida, Hiromitsu et al., "A Compact T/R Switching Circuit Using Quadrature Couplers and Drain-Driven HPAs," 2001 IEEE MTT-S International Microwave Symposium Digest, vol. 2, 2001, IEEE, pp. 1349-1352.

*Primary Examiner* — Graham Smith
(74) *Attorney, Agent, or Firm* — Withrow & Terranova, P.L.L.C.

(57) ABSTRACT

A self-activated transfer switch is disclosed. The self-activated transfer switch includes a transmit (TX) switch coupled between a TX port and an antenna port. A receive (RX) switch is coupled between the antenna port and an RX port, and RF-to-bias generator circuitry is coupled to the TX port and the antenna port. The RF-to-bias generator circuitry is configured to generate a bias signal to turn off the RX switch and turn on the TX switch when either of a TX signal is provided at the TX port and a jammer signal is received at the antenna port. The bias signal is generated from energy of at least one of the TX signal and the jammer signal. The TX switch is turned off and the RX switch is turned on when the bias signal is not being generated.

22 Claims, 9 Drawing Sheets

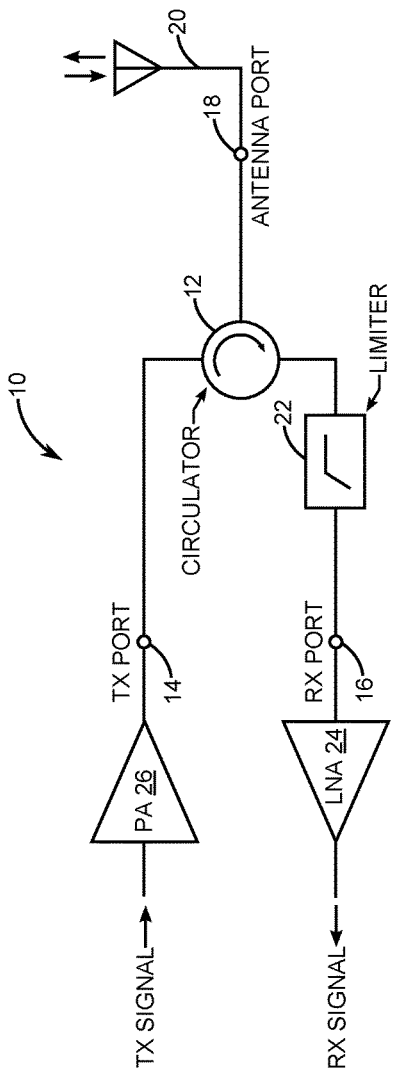
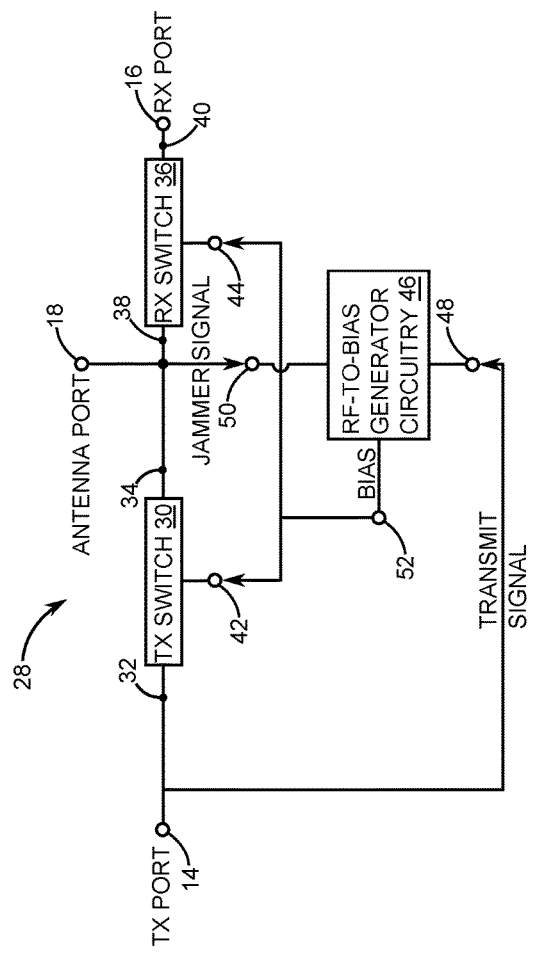
FIG. 1 (RELATED ART)
FIG. 2

SELF-ACTIVATED TRANSFER SWITCH

RELATED APPLICATIONS

This application claims the benefit of provisional patent application Ser. No. 62/193,730, filed Jul. 17, 2015, the disclosure of which is hereby incorporated herein by reference in its entirety.

FIELD OF THE DISCLOSURE

The present disclosure relates to circuitry for routing transmit and receive signals to and from an antenna port while protecting sensitive transceiver devices from damaging jammer signals received through the antenna port.

BACKGROUND

FIG. 1 is a simplified block diagram of a related art radar transceiver 10. A magnetic circulator 12 is coupled between a transmit (TX) port 14, a receive (RX) port 16, and an antenna port 18. The magnetic circulator 12 directs a TX signal and an RX signal to and from an antenna 20 coupled to the antenna port 18. A limiter 22 coupled between the magnetic circulator 12 and the RX port 16 is included to protect a low noise amplifier (LNA) 24 from potentially damaging RF signal levels of a harmful RX signal such as a jammer signal. For the purpose of this disclosure, a TX signal is defined as a provided signal that is desired to be transmitted through the antenna port 18 to a load such as the antenna 20. Also for the purpose of this disclosure, a jammer signal is defined as a received signal that is not desired to be passed to the RX port 16.

In a TX mode, the TX signal is amplified to a relatively high power level by a power amplifier (PA) 26 and passed to the magnetic circulator 12 through the TX port 14. The amplified TX signal would ideally be 100% directed to the antenna 20 from which the amplified radar signal is radiated toward a radar target (not shown). When in an RX mode, a radar signal reflected from the radar target is received by the antenna 20. Ideally, the relatively weak radar signal is 100% directed to the LNA 24 for amplification before detection and processing.

The magnetic circulator 12 performs a signal routing function. However, the magnetic circulator 12 is not ideal and thus only provides finite isolation. In other words, the magnetic circulator 12 does not direct 100% of the TX signal as intended, therefore, some TX power will leak into an RX path made up of the limiter 22, the RX port 16 and the LNA 24. Also, if the antenna 20 gets illuminated by another high power source such as a jamming signal, high power levels would be directed to the LNA 24. Therefore, to protect the LNA 24 from either scenario, the limiter 22 is typically included in front of the LNA 24 in the RX path to limit the voltage amplitude of the jamming signal before the jamming signal passes through the RX port 16 to the LNA 24. Typically, the limiter 22 is a p-type-intrinsic-n-type (PIN) diode based circuit.

Modern realizations of both the limiter 22 and the magnetic circulator 12 are bulky and expensive. Moreover, the magnetic circulator 12 is typically the largest component integrated within a radar transceiver module (not shown). A further undesirable characteristic is that the magnetic circulator 12 and the limiter 22 are not generally compatible with monolithic implementation utilizing gallium arsenide (GaAs) or gallium nitride (GaN) monolithic microwave integrated circuit (MMIC) technology. These undesirable issues significantly impact any feasibility of a fully integrated radar transceiver frontend. What is needed is a monolithically compatible circuit that replaces the magnetic circulator 12 and the limiter 22 in radar frontends.

SUMMARY

A self-activated transfer switch is disclosed. The self-activated transfer switch includes a transmit (TX) switch coupled between a TX port and an antenna port. A receive (RX) switch is coupled between the antenna port and an RX port, and RF-to-bias generator circuitry is coupled to the TX port and the antenna port. The RF-to-bias generator circuitry is configured to generate a bias signal to turn off the RX switch and turn on the TX switch when either of a TX signal is provided at the TX port or a jammer signal is received at the antenna port. The bias signal is generated from energy of at least one of the TX signal and the jammer signal. The TX switch is turned off and the RX switch is turned on when the bias signal is not being generated.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 is a simplified block diagram of a related art radar transceiver.

FIG. 2 is a simplified block diagram of a self-activated transfer switch that replaces the magnetic circulator and the limiter of the related art radar transceiver of FIG. 1.

DETAILED DESCRIPTION

Figure 3:
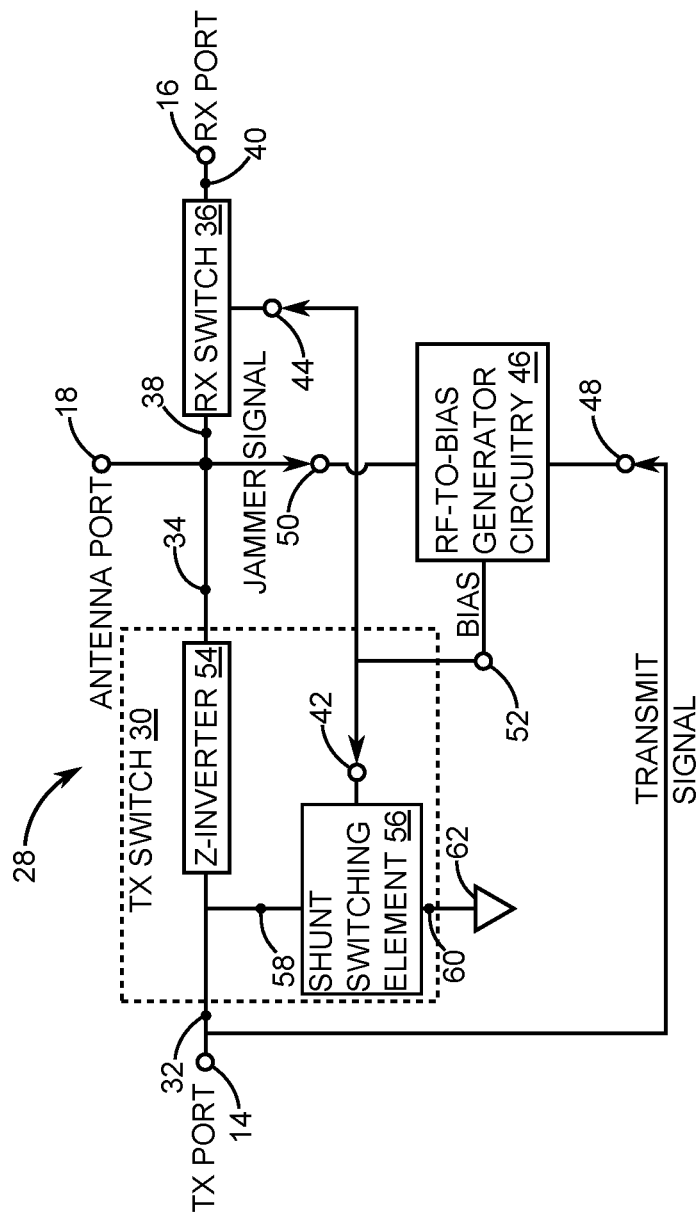
FIG. 3 is a simplified block diagram of the self-activated transfer switch showing an exemplary embodiment of transmit (TX) switch elements and structure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

FIG. 2 is a simplified block diagram of a self-activated transfer switch 28 that replaces the magnetic circulator 12 and the limiter 22 of the related art radar transceiver 10 of FIG. 1. The self-activated transfer switch 28 includes TX switch 30 having a TX input 32 coupled to the TX port 14 and a TX output 34 coupled to the antenna port 18. A receive (RX) switch 36 has an RX input 38 coupled to the antenna port 18 and an RX output 40 coupled to the RX port 16.

In exemplary embodiments, the TX switch 30 and the RX switch 36 are both realized with field effect transistor (FET) type electronic switches that require a bias voltage to control ON and OFF switching. During operation, bias voltages are applied to a TX control input 42 of the TX switch 30 and an RX control input 44 of the RX switch 36. In the exemplary embodiments, the TX switch 30 and the RX switch 36 are both realized with depletion mode (D-mode) type FETs that are controlled by a bias signal that has a negative voltage level sufficient to turn on the TX switch 30 and turn off the RX switch 36. As such, the TX control input 42 and the RX control input 44 are coupled together in the exemplary embodiment of FIG. 2. For the purpose of this disclosure the bias signal is defined as a control signal that switches the TX switch 30 and the RX switch 36 between a conductive state that is referred to herein as ON and a non-conductive state that is referred to herein as OFF.

RF-to-bias generator circuitry 46 generates the bias signal needed to control ON and OFF switching of both the TX switch 30 and the RX switch 36. The RF-to-bias generator circuitry 46 has a TX energy input 48 coupled to the TX port 14 and an RX energy input 50 coupled to the antenna port 18. The RF-to-bias generator circuitry 46 also includes a bias output 52 that is coupled to both the TX control input 42 of the TX switch 30 and the RX control input 44 of the RX switch 36. The RF-to-bias generator circuitry 46 is configured to generate the bias signal to turn on the TX switch 30 and turn off the RX switch 36 when either of a TX signal is provided at the TX port 14 and a jammer signal is received at the antenna port 18. The bias signal is generated from energy of at least one of the TX signal and the jammer signal. The bias signal needed to turn on the TX switch 30 and turn off the RX switch 36 is a negative voltage for embodiments in which the TX switch 30 and the RX switch 36 are realized with D-mode type FETs. Due to the inclusion of the RF-to-bias generator circuitry 46 combined with the unique structure of the self-activated transfer switch 28, the self-activated transfer switch requires no externally generated DC bias voltage and no external DC power to operate.

FIG. 3 is a simplified block diagram of the self-activated transfer switch 28 of FIG. 2 depicting an exemplary embodiment of the TX switch 30. In the exemplary embodiment, the TX switch 30 is made up of an impedance inverter (Z-inverter) 54 coupled between the TX port 14 and the antenna port 18. A shunt switching element 56 has a shunt input 58 coupled to the TX port 14 and a shunt output 60 coupled to a fixed voltage node 62 that is typically RF ground. The shunt switching element 56 presents a high impedance to node at the TX input 32 when a negative bias voltage is applied to node 42 and presents a low impedance to the node at the TX input 32 when the fixed voltage at the fixed voltage node 62 is applied to TX control 42.

Figure 4:
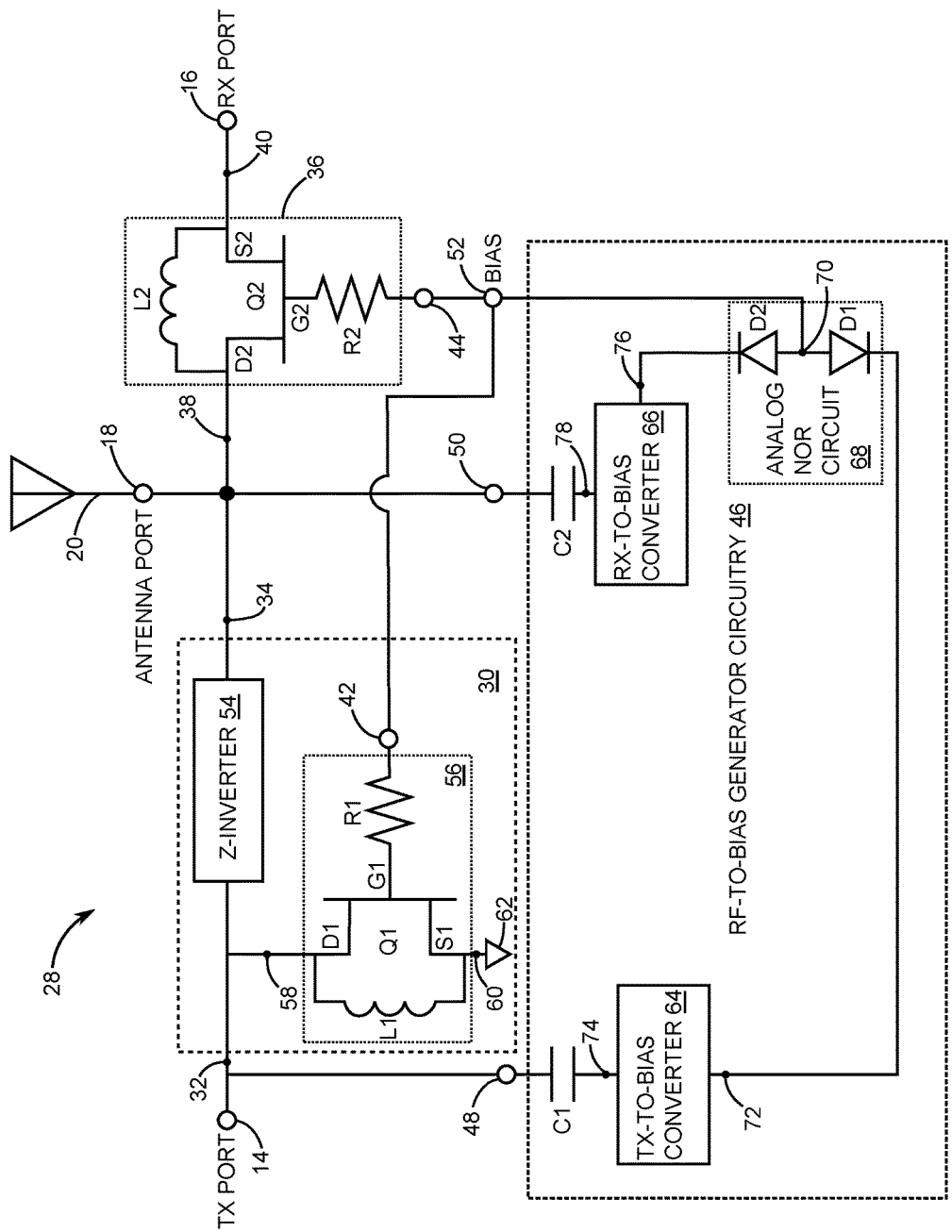
FIG. 4 is a schematic diagram of a first embodiment of the self-activated transfer switch of FIG. 3.

FIG. 4 is a schematic diagram of the self-activated transfer switch 28. In this embodiment, the shunt switching element 56 is a first FET Q1 of the D-mode type having a first drain D1 coupled to the TX port 14 and a first source S1 coupled to the fixed voltage node 62. A first gate G1 of the first FET Q1 is coupled to the TX control input 42. In this exemplary embodiment the shunt switching element 56 includes a first inductor L1 that is coupled across the first FET Q1 at the first drain D1 and the first source S1. The first inductor L1 has an inductance value that is selected to cause an OFF-state capacitance of the first FET Q1 to resonate with the first inductor L1, thereby producing practically open circuit impedance when the first FET Q1 is OFF. A first resistor R1 is coupled between the TX control input 42 and the first gate G1 to provide a high impedance at the TX control 42.

In this embodiment, the RX switch 36 is a second FET Q2 of the D-mode type. The RX switch 36 has a second drain D2 coupled to the antenna port 18 and a second source S2 coupled to the RX port 16. A second gate G2 of the second FET Q2 is coupled to the RX control input 44. In this exemplary embodiment, the RX switch 36 includes a second inductor L2 that is coupled across the second FET Q2 at the second drain D2 and the second source S2. The second inductor L2 has an inductance value that is selected to cause an OFF-state capacitance of the second FET Q2 to resonate with the second inductor L2, thereby producing practically open circuit impedance when the second FET Q2 is OFF. A second resistor R2 is coupled between the RX control input 44 and the second gate G2 to provide a high impedance at RX control input 44. In some embodiments, the first FET Q1 and the second FET Q2 are gallium arsenide (GaAs) FETs, in other embodiments, the first FET Q1 and the second FET Q2 are gallium nitride (GaN) FETs, and in yet other embodiments, the first FET Q1 and the second FET Q2 are silicon FETs. It is to be understood that switching elements such as the first FET Q1 and the second FET Q2 are often symmetric with respect to the source and the drain meaning that an interchange of the source and drain can be made with no change to circuit functionality.

FIG. 4 also shows the RF-to-bias generator circuitry 46 in more detail. In this embodiment, the RF-to-bias generator circuitry 46 includes a TX-to-bias converter 64, an RX-to-bias converter 66, and an analog NOR circuit 68. The analog NOR circuit 68 is made up of a first diode D1 and a second diode D2 that are anode coupled at a bias node 70 to which the bias output 52 is coupled. The cathode of the first diode D1 is coupled to a first converter output 72 of the TX-to-bias converter 64. A first coupling capacitor C1 is coupled between the TX energy input 48 and a first converter input 74 of the TX-to-bias converter 64. A first capacitance value of the first coupling capacitor C1 determines how much TX signal energy is provided to the TX-to-bias converter 64 from the TX port 14. The cathode of the second diode D2 is coupled to a second converter output 76 of the RX-to-bias converter 66. A second coupling capacitor C2 is coupled between the RX energy input 50 and a second converter input 78. A second capacitance value of the second coupling capacitor C2 determines how much jammer signal energy is provided to the RX-to-bias converter 66 from the antenna port 18.

Figure 5:
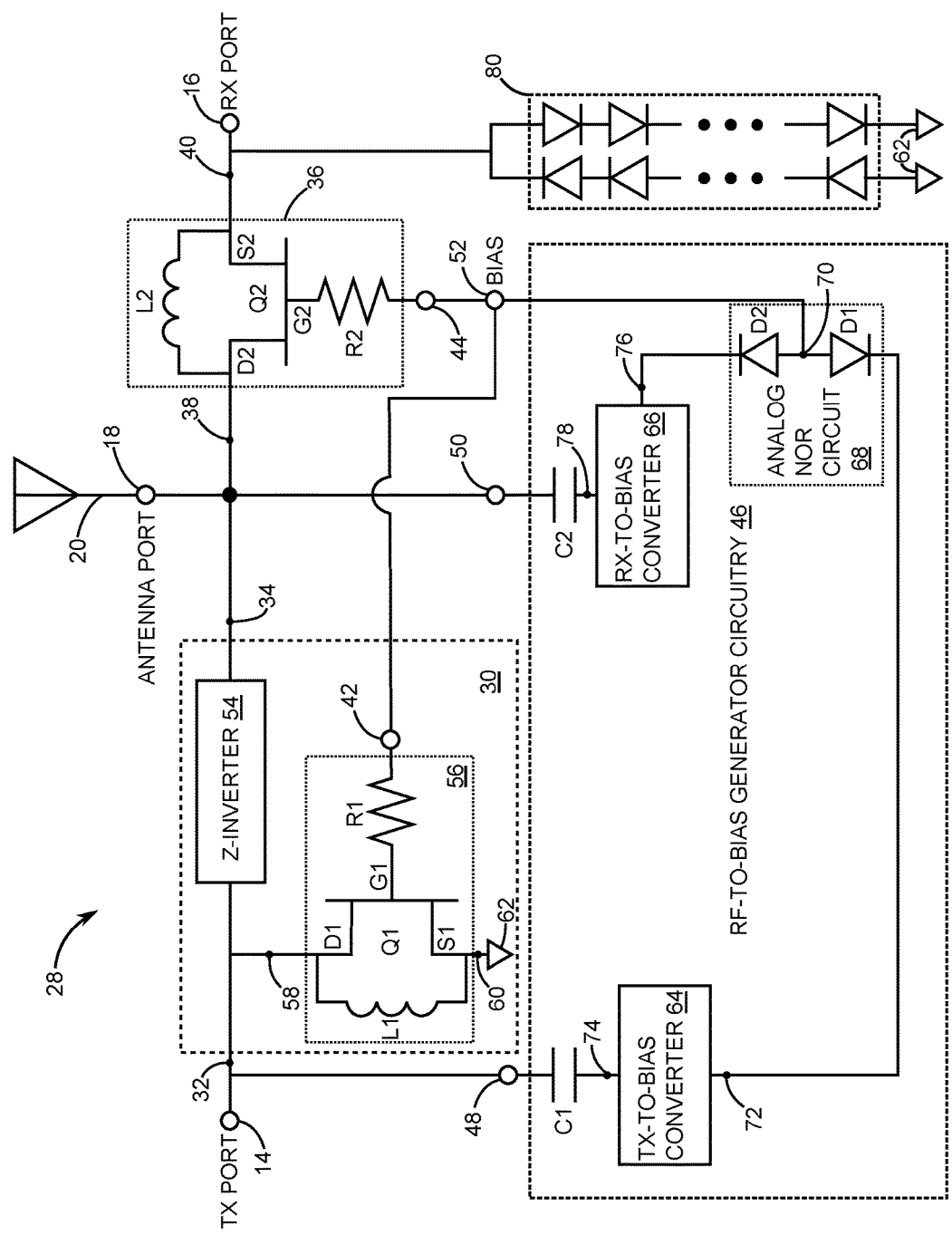
FIG. 5 is a schematic diagram of a second embodiment of the self-activated transfer switch of FIG. 3.

FIG. 5 is a schematic diagram of a second embodiment of the self-activated transfer switch 28 of FIG. 2. This embodiment couples a plurality of series-connected anti-parallel gate diodes 80 between the RX port 16 and the fixed voltage node 62. The plurality of series-connected anti-parallel gate diodes 80 protect the RX port 16 from damage from what is known as spike leakage. The first FET Q1 and the second FET Q2 have finite switching speed, thus there is a possibility that a rising edge of a pulsed high power TX signal or jammer signal will reach the RX port 16 before the second FET Q2 is completely turned OFF. This undesirable situation results in spike leakage that can damage sensitive receiver devices such as the LNA 24 (related art FIG. 1). The number of gate diodes making up the plurality of series-connected anti-parallel gate diodes 80 is determined such that the plurality of series-connected anti-parallel diodes 80 are not conducting after Q2 is completely turned off and can be determined by way of mathematical calculation, circuit simulation, and/or laboratory experimentation.

Figure 6:
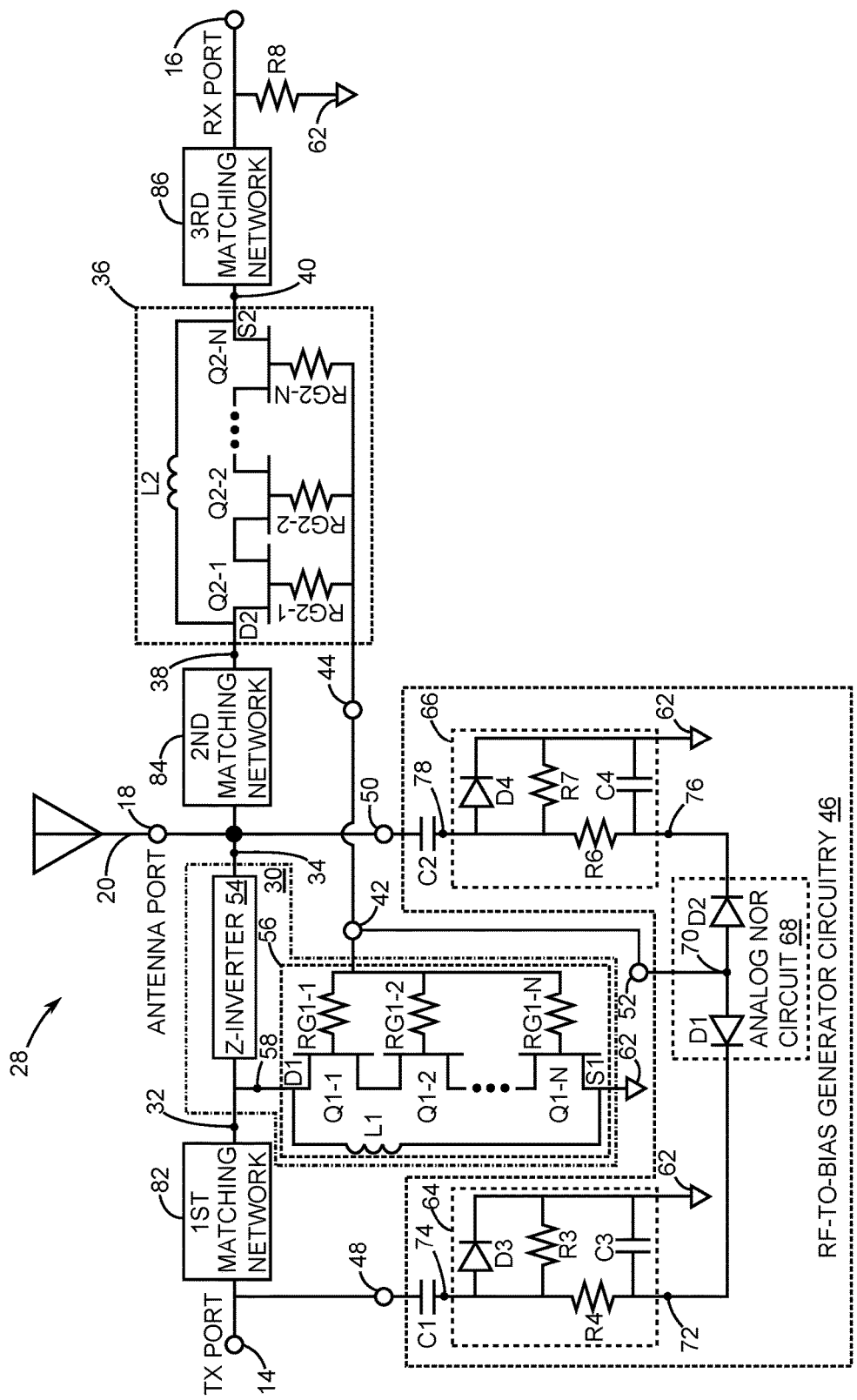
FIG. 6 is a schematic diagram of the first embodiment of the self-activated transfer switch that is integrable into a monolithic microwave integrated circuit (MMIC).

FIG. 6 is a schematic diagram of the first embodiment of the self-activated transfer switch 28 that is integrable into a monolithic microwave integrated circuit (MMIC). As shown in FIG. 6, the shunt switching element 56 and the RX switch 36 can each be made up of stacked transistors to increase power handling for a given negative off-state voltage. In the exemplary case of FIG. 6, a transistor stack for the shunt switching element 56 is depicted as transistors Q1-1 and Q1-2 through Q1-N while the RX switch 36 is depicted as transistors Q2-1 and Q2-2 through Q2-N, wherein N is a finite number. The transistors Q1-1 and Q1-2 through Q1-N each have a gate resistor RG1-1 and RG1-2 through Q1-N, respectively. Likewise, the transistors Q2-1 and Q2-2 through Q2-N each have a gate resistor RG2-1, RG2-2 through RG2-N, respectively.

In this exemplary embodiment, a first matching network 82 is coupled between the TX port 14 and the TX input 32. The first matching network 82 has tuned impedance to transfer maximum power from the TX port 14 to the Z-inverter 54. A second matching network 84 is coupled between the antenna port 18 and the RX input 38 of the RX switch 36. The second matching network 84 has tuned impedance that provides maximum power transfer from the antenna port 18 to the RX output 40 when the RX switch 36 is turned on. A third matching network 86 has tuned impedance that provides maximum power transfer from the RX output 40 to a load. Resistor R8 is coupled between the RX port 16 and the fixed voltage node 62 to insure that the fixed voltage present at the fixed voltage node 62 is applied to node 16. In at least one exemplary case, the first matching network 82, the second matching network 84, and the third matching network 86 are each made up of passive on-chip circuitry. Exact topology of the passive on-chip circuitry is a function of transmit signal frequency, receive signal frequency, power level and fabrication process technology.

FIG. 6 also provides detail for the TX-to-bias converter 64 and the RX-to-bias converter 66. The TX-to-bias converter 64 is made up of a first rectifier diode D3 coupled between the first converter input 74 and the fixed voltage node 62, a first parallel resistor R3 coupled across the first rectifier diode D3, a first filter resistor R4 coupled between the first converter output 72 and the first converter input 74, and a first filter capacitor C3 coupled between the first converter output 72 and the fixed voltage node 62. In operation, a portion of a TX signal arriving at the TX port 14 is rectified by the first rectifier diode D3 to produce a first rectified voltage. A first filter comprised of the first parallel resistor R3, the first filter capacitor C3, and the first filter resistor R4 attenuates alternating current (AC) components of the first rectified voltage to provide a first negative voltage level at the first converter output 72.

The RX-to-bias converter 66 is similarly structured to the TX-to-bias converter 64. In particular, the RX-to-bias converter 66 is made up of a second rectifier diode D4 coupled between the second converter input 78 and the fixed voltage node 62, a second parallel resistor R7 coupled across the second rectifier diode D4, a second filter resistor R6 coupled between the second converter output 76 and the second converter input 78, and a second filter capacitor C4 coupled between the second converter output 76 and the fixed voltage node 62. In operation, a portion of a jammer signal arriving at the antenna port 18 is rectified by the second rectifier diode D4 to provide a second rectified voltage. A second filter comprised of the second parallel resistor R7, the second filter capacitor C4, and the second filter resistor R6 attenuates alternating current (AC) components of the second rectified voltage to provide a second negative voltage level at the second converter output 76. A most negative one of the first negative voltage level and the second negative level is substantially provided at the bias output 52. More generally, whichever of the first bias voltage and the second bias voltage has a greater magnitude is conveyed to the bias output 52 by the analog NOR circuit 68. As such, a larger amplitude of either a TX signal at the TX port 14 or a jammer signal at the antenna port 18 controls the switching of both the shunt switching element 56 and the RX switch 36. Thus, the operation of the self-activated transfer switch 28 is automatic.

In operation, there will be a transition region (FIG. 8) between the RX mode and the TX mode as incident power increases on the TX port 14. An incident power where a transition will occur is adjusted by altering the capacitance values of the first coupling capacitor C1 and the second coupling capacitor C2. System level specifications for the self-activated transfer switch 28 that govern RX mode linearity along with the onset of the transition region will occur after a transition incident power level is reached. There will also be a system specification controlling how much power the RX port 16 can tolerate without damage to LNAs and other external RX circuitry coupled to the RX port 16. Moreover, there are other system specifications that dictate how far into the transition region an incident power level go without exceeding a maximum power level. Finally, there will be a specified TX signal power level wherein the self-activated transfer switch will have to be fully transitioned to begin the TX mode.

Figure 7:
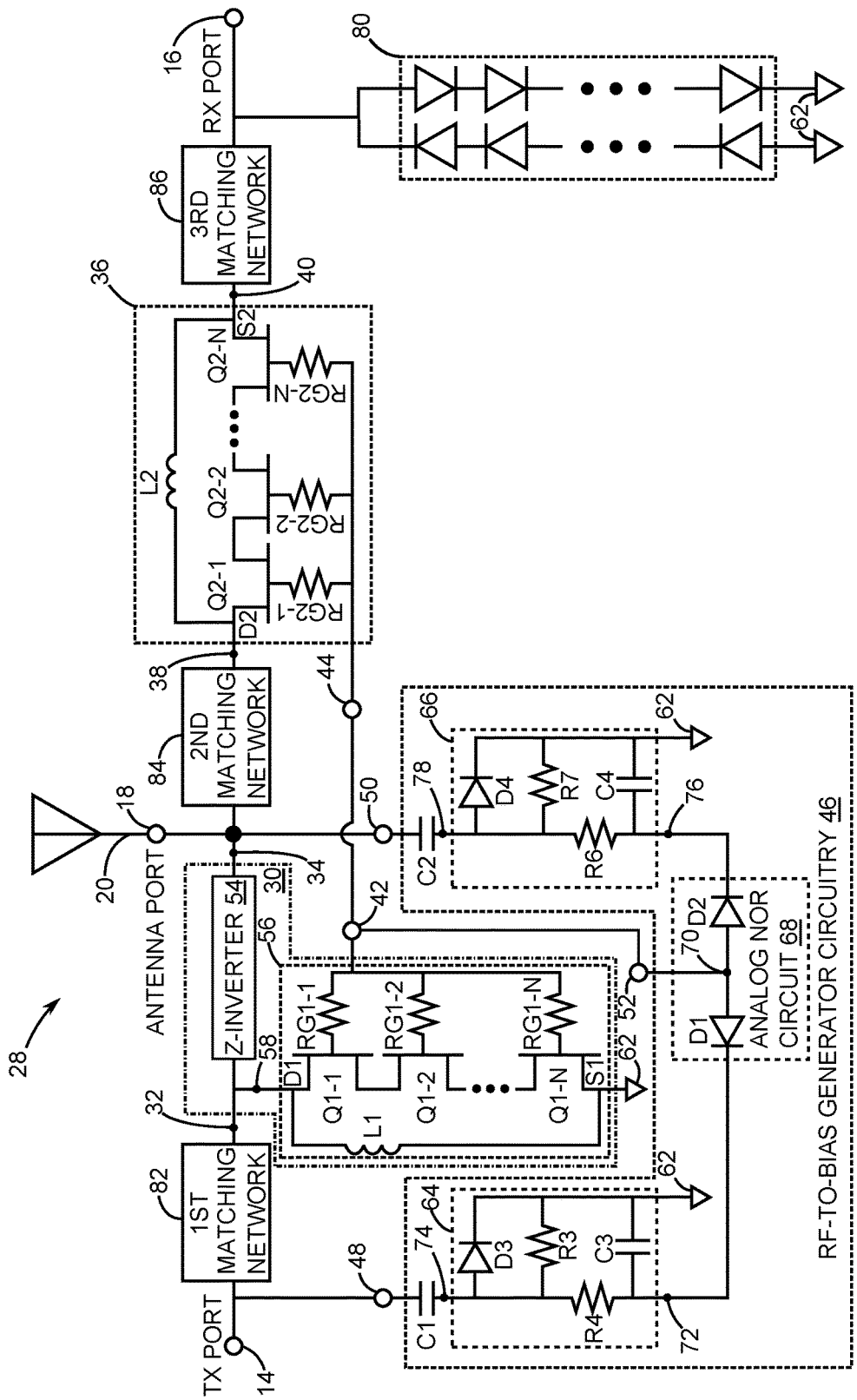
FIG. 7 is a schematic diagram of the second embodiment of the self-activated transfer switch that is integrable into a MMIC.

FIG. 7 is a schematic diagram of the second embodiment of the self-activated transfer switch 28 that is integrable into an MMIC. The topology of the second embodiment of the self-activated transfer switch 28 of FIG. 7 is identical to the topology of the first embodiment of the self-activated transfer switch 28 of FIG. 6 with the exception of the protection of the RX port 16. This embodiment couples the plurality of series-connected anti-parallel gate diodes 80 between the RX port 16 and the fixed voltage node 62. The plurality of series-connected anti-parallel gate diodes 80 protects the RX port 16 from damage from spike leakage. In this embodiment, the plurality of series-connected anti-parallel gate diodes 80 is integral with the remainder of the self-activated transfer switch 28 to realize a complete MMIC.

A target application for the self-activated transfer switch 28 is a fully integrated front end for S-band radar with 100 W power handling capability. GaN LNAs are very robust compared to their GaAs counterparts and can handle multiple watts of incident power. As such, a GaN LNA is used for the LNA 24 in testing the embodiments of the present disclosure. Moreover, the shunt switching element 56 and the RX switch 36 both employ stacked FETs to meet a 100 W power handling requirement. The Z-inverter 54 is realized as a quarter wavelength 50Ω microstrip transmission line. Inductors (not shown) are coupled to the TX port 14, the RX port 16 and the antenna port 18 to model interconnect bond wires used for an MMIC layout.

Figure 8:
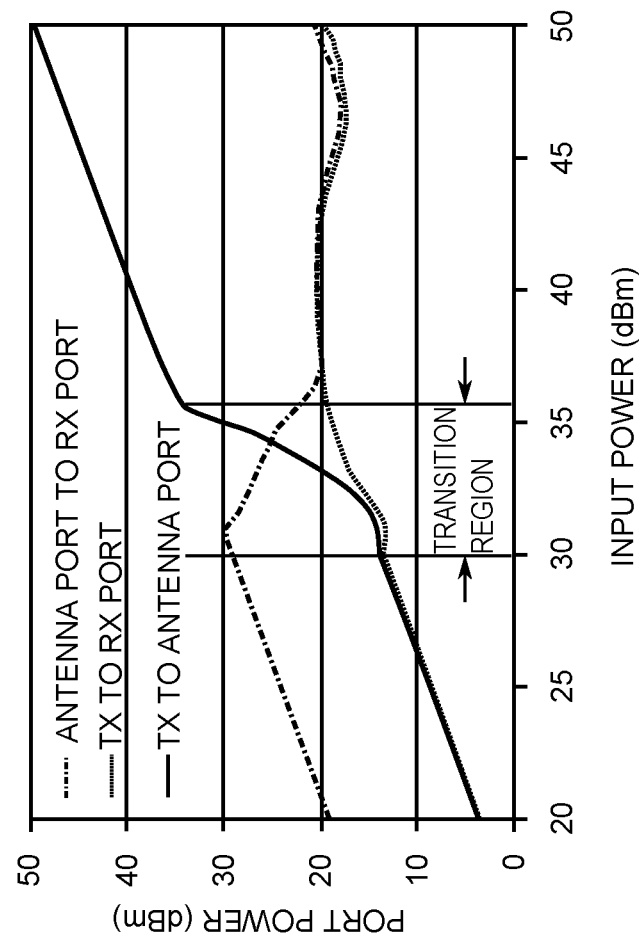
FIG. 8 is a graph of port power versus input power that depicts simulated transfer characteristics at a transmit frequency of 3.3 GHz.

FIG. 8 is a graph of port power versus input power that depicts simulated transfer characteristics at a transmit frequency of 3.3 GHz. At relatively low power, the self-activated transfer switch 28 transfers received signals from the antenna port 18 to the RX port 16 with less than 0.75 dB of loss up to about 28 dBm. At 28 dBm and beyond, the self-activated transfer switch 28 limits RX power to less than 1 W. Power leaking from the TX port 14 to the RX port 16 is limited to less than 21 dBm. The TX mode turns on at about 38 dBm and transfers power to the antenna port 18 through 100 W with less than 0.63 dB of loss.

Figure 9:
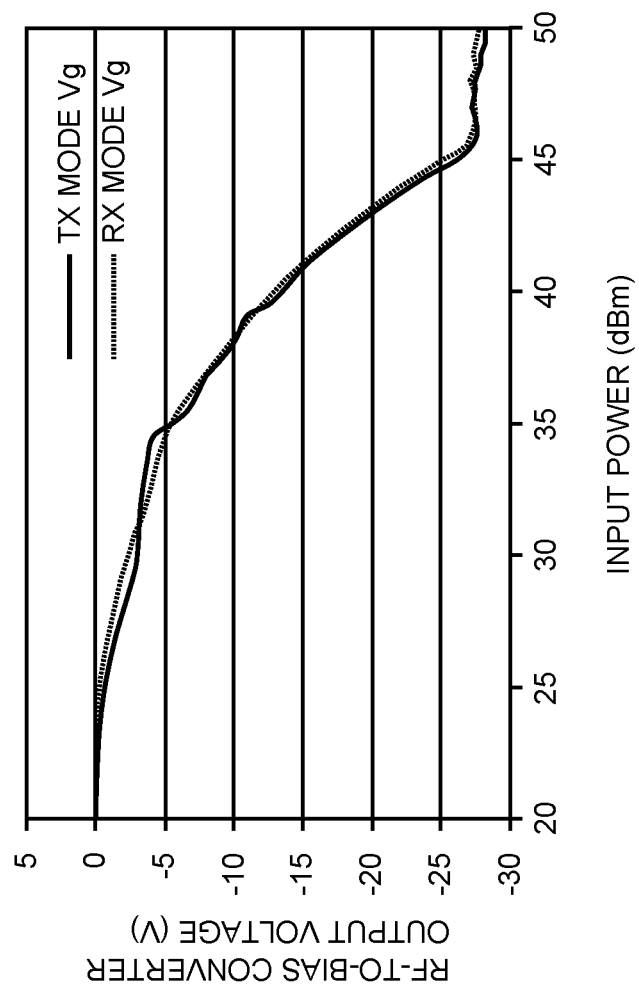
FIG. 9 is a graph of bias voltage generated by the TX-to-bias converter and the RX-to-bias converter.

FIG. 9 is a graph of bias voltage generated by the TX-to-bias converter 64 and the RX-to-bias converter 66. Note that more than −25 V of bias voltage is generated above 45 dBm of TX signal power or jammer signal power.

Figure 10:
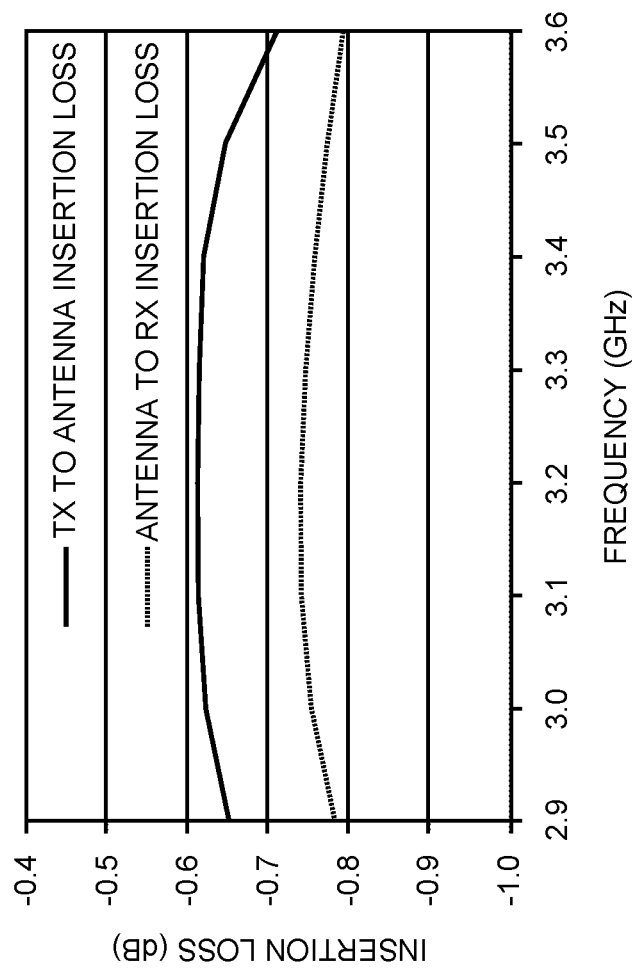
FIG. 10 is a graph of simulated insertion lost versus frequency for the self-activated transfer switch for the RX mode under relatively low power conditions and the TX mode for a 100 W TX signal.

FIG. 10 is a graph of simulated insertion lost versus frequency for the self-activated transfer switch 28 for the RX mode under relatively low power conditions and the TX mode for a 100 W TX signal. In particular, the self-activated transfer switch 28 demonstrates about 15% bandwidth which is acceptable for typical radar systems. RX insertion loss is better 0.77 dB over a 3.0-3.5 GHz design band. TX mode large signal insertion loss is estimated to be better than 0.65 dB over the 3.0-3.5 GHz design band. Note that RX mode insertion loss would be greater in existing systems as a related art RX path includes both the magnetic circulator 12 (FIG. 1) and the limiter 22 (FIG. 1) in which a TX path includes only the magnetic circulator 12.

Those skilled in the art will recognize improvements and modifications to the preferred embodiments of the present disclosure. All such improvements and modifications are considered within the scope of the concepts disclosed herein and the claims that follow.

What is claimed is:

1. A self-activated transfer switch comprising:
a transmit (TX) switch coupled between a TX port and an antenna port;
a receive (RX) switch coupled between the antenna port and an RX port; and
RF-to-bias generator circuitry coupled to the TX port and the antenna port and configured to generate a bias signal to turn off the RX switch and turn on the TX switch when either of a TX signal is provided at the TX port and a jammer signal is received at the antenna port, wherein the bias signal is generated from energy of at least one of the TX signal and the jammer signal, and wherein the TX switch is turned off and the RX switch is turned on when the bias signal is not being generated.

2. The self-activated transfer switch of claim 1 wherein the TX switch comprises:
an impedance inverter coupled between the TX port and the antenna port; and
a shunt switching element coupled between the TX port and a fixed voltage node.

3. The self-activated transfer switch of claim 2 wherein the fixed voltage node is RF ground.

4. The self-activated transfer switch of claim 2 wherein the TX switch and the RX switch each comprises stacked field effect transistors (FETs).

5. The self-activated transfer switch of claim 4 wherein the TX switch is configured to switch at least 100 W of RF power.

6. The self-activated transfer switch of claim 5 wherein the RF power is transmitted as an S-band radar signal having a frequency that falls within 2 GHz and 4 GHz.

7. The self-activated transfer switch of claim 4 wherein the stacked FETs are operated in depletion mode.

8. The self-activated transfer switch of claim 4 wherein the stacked FETs are a gallium nitride (GaN) type.

9. The self-activated transfer switch of claim 4 further including an inductor to resonate with an OFF-state capacitance of the TX switch thereby producing practically open circuit impedance when a switching element of the TX switch is OFF.

10. The self-activated transfer switch of claim 4 wherein the RX switch includes an inductor to resonant with an OFF-state capacitance of the RX switch thereby producing practically open circuit impedance when the RX switch is OFF.

11. The self-activated transfer switch of claim 1 wherein the RF-to-bias generator circuitry having a bias output coupled to both of a TX control input of the TX switch and an RX control input of the RX switch comprises:
 a TX-to-bias converter having a first converter input coupled to the TX port by way of a first coupling capacitor, and a first converter output, wherein the TX-to-bias converter is configured to generate a first bias voltage at the first converter output;
 an RX-to-bias converter having a second converter input coupled to the antenna port by way of a second coupling capacitor, and a second converter output, wherein the RX-to-bias converter is configured to generate a second bias voltage at the second converter output; and
 an analog NOR circuit comprising a first diode having a first cathode coupled to the first converter output and a second diode having a second cathode coupled to the second converter output, and wherein the first diode and second diode are anode coupled to the bias output to provide whichever of the first bias voltage and the second bias voltage has a greater magnitude to the bias output.

12. The self-activated transfer switch of claim 11 wherein either of the first bias voltage generated from a TX signal of at least 45 dBm and the second bias voltage generated from a jammer signal of at least 45 dBm has a magnitude of at least 25 volts.

13. The self-activated transfer switch of claim 11 wherein the TX-to-bias converter comprises:
 a first rectifier diode configured to rectify a portion of a TX signal at the TX port and provide a first rectified voltage; and
 a first filter to attenuate alternating current (AC) components of the first rectified voltage to generate the first bias voltage.

14. The self-activated transfer switch of claim 13 wherein the RX-to-bias converter comprises:
 a second rectifier diode configured to rectify a portion of a jammer signal at the antenna port and provide a second rectified voltage; and
 a second filter to attenuate alternating current (AC) components of the second rectified voltage to generate the second bias voltage.

15. The self-activated transfer switch of claim 1 wherein the impedance inverter has a lower impedance port coupled to the TX port and a higher impedance port coupled to the antenna port.

16. The self-activated transfer switch of claim 1 wherein the impedance inverter is a quarter wavelength 50Ω microstrip line.

17. The self-activated transfer switch of claim 3 further including a plurality of series-connected anti-parallel gate diodes coupled between the RX port and RF ground.

18. The self-activated transfer switch of claim 1 wherein RX signals up to 28 dBm in power transfers from the antenna port to the RX port with a power loss limited to no more than 0.75 dB.

19. The self-activated transfer switch of claim 1 wherein leakage of TX power from the TX port to the RX port is limited to no more than 21 dBm.

20. The self-activated transfer switch of claim 1 wherein TX power is transferred from the TX port to the antenna port with no more than a 0.63 dB loss.

21. The self-activated transfer switch of claim 1 wherein the RX switch, the TX switch, and the RF-to-bias generator circuitry are integrated into a monolithic microwave integrated circuit (MMIC).

22. The self-activated transfer switch of claim 1 wherein the self-activated transfer switch requires no external DC bias voltage and no external DC power during operation.

* * * * *

UNITED STATES PATENT AND TRADEMARK OFFICE
CERTIFICATE OF CORRECTION

PATENT NO. : 9,912,371 B2
APPLICATION NO. : 15/082353
DATED : March 6, 2018
INVENTOR(S) : Charles Forrest Campbell Page 1 of 1

It is certified that error appears in the above-identified patent and that said Letters Patent is hereby corrected as shown below:

In Claim 1, Column 8, Line 37, replace "and a jammer signal" with --or a jammer signal--.

Signed and Sealed this
Tenth Day of April, 2018

Andrei Iancu
*Director of the United States Patent and Trademark Office*